Figure 1:
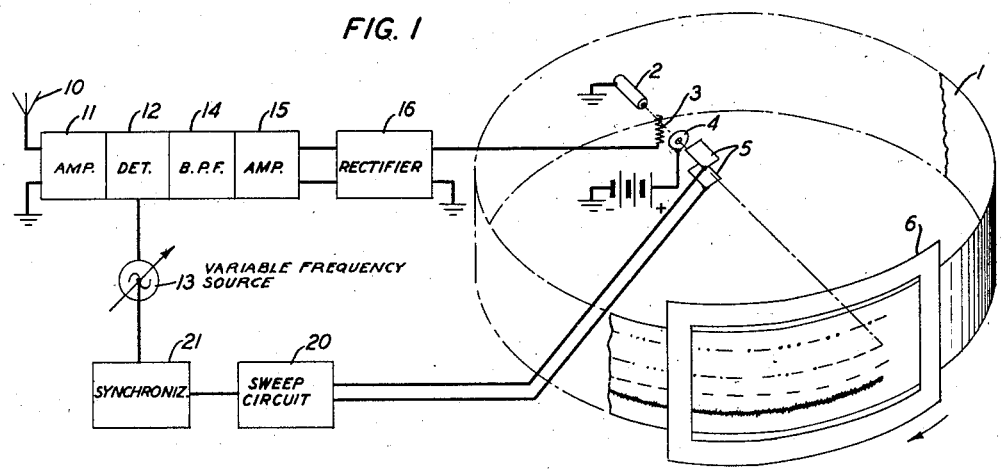

Feb. 25, 1947. R. K. POTTER 2,416,346
VISUAL RECEPTION OF RADIO WAVES
Filed April 14, 1942

INVENTOR
R. K. POTTER
BY
ATTORNEY

Patented Feb. 25, 1947

2,416,346

UNITED STATES PATENT OFFICE 2,416,346

VISUAL RECEPTION OF RADIO WAVES

Ralph K. Potter, Madison, N. J., assignor to Bell Telephone Laboratories, Incorporated, New York, N. Y., a corporation of New York Application April 14, 1942, Serial No. 438,879

8 Claims. (Cl. 250—20)

This invention relates to systems and methods adapted for the reception and visual representation of electromagnetic wave energy appearing in different transmission channels distributed throughout a wide range of radio frequencies. The invention has application especially to the monitoring of radio transmission whereby all radio communication channels within a predetermined frequency range may be simultaneously and continuously observed.

An object of the present invention is to provide an improved system of the kind to which the invention relates in which, as compared with systems known heretofore, the visual representation of different radio transmissions may be continuously monitored with far less strain on the monitoring observer, and in which impulses or other transmissions of short duration may be readily detected, the character of the transmissions in the several channels may be ascertained more readily and with greater certainty, and the passage of time is translated into terms of displacement of the representation.

Another object of the invention is to translate telegraphic radio signals into a visual representation such that visible dots and dashes corresponding to the telegraphic signals appear to an observer to flow continuously across the field of view.

In accordance with an embodiment of the present invention there is provided a cathode ray oscilloscope and a radio wave receiver adapted to scan cyclically the radio frequency range of interest and to control the intensity of the cathode ray in accordance with the wave intensity observed in the successively encountered frequency channels. The cathode ray, or the luminescent spot produced by the ray, is simultaneously displaced cyclically across the screen of the oscilloscope in synchronism with the scanning operation and in a plane that is fixed relative to the observer. At the same time the screen is rotated or otherwise progressively moved relative to the observer so that the luminous record left by the cathode ray appears to flow across the screen from a fixed generating point.

The nature of the present invention and its various objects, features and advantages will appear more fully from a consideration of the embodiments illustrated in the accompanying drawing and now to be described. In the drawing, Figs. 1 and 2 illustrate two embodiments of the invention utilizing different types of oscilloscopes.

Figure 2:
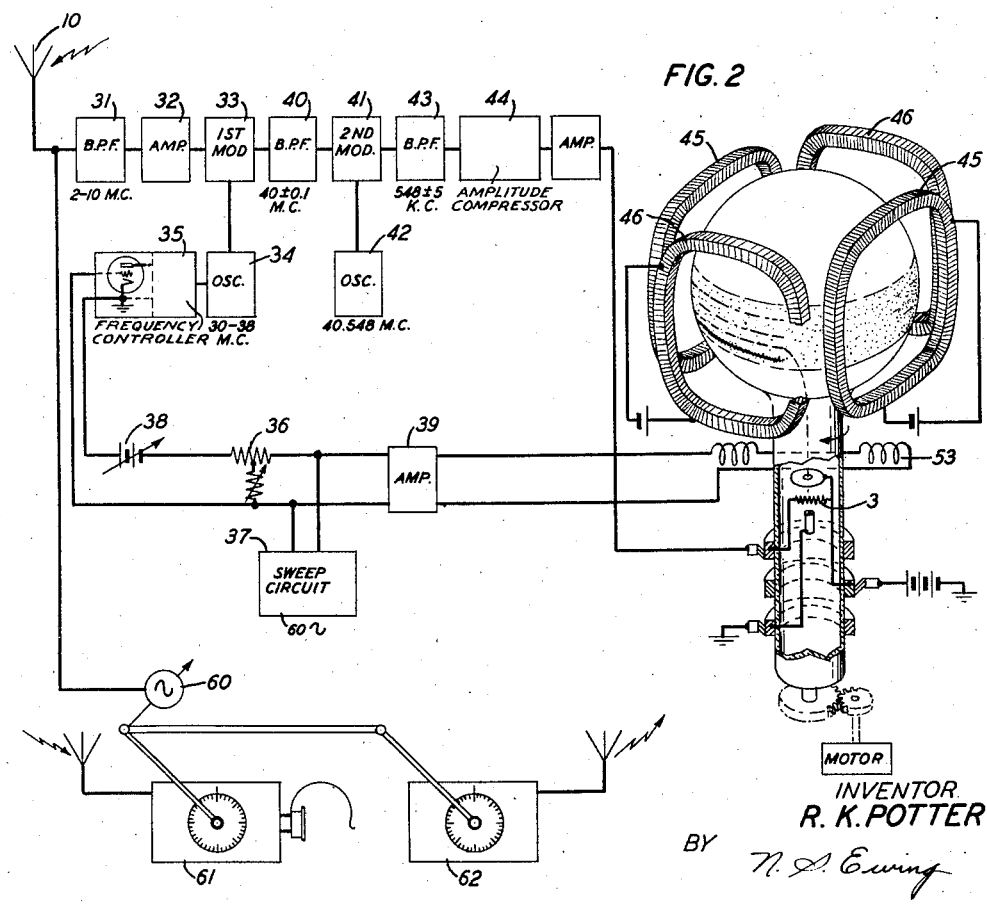

Referring to Fig. 1, there is shown schematically a system in accordance with the invention in which the output of a radio scanning receiver and the output of a sweep circuit are applied to control the cathode ray in a cathode ray oscilloscope of unusual construction. An oscilloscope of the kind indicated is disclosed and claimed in my copending application Serial No. 422,194, filed December 9, 1941 (Patent No. 2,403,996, July 16, 1946), to which reference may be made for details of construction. For present purposes it will suffice to say that the oscilloscope comprises a luminescent screen 1 of substantially cylindrical form arranged for continuous rotation about its axis, and means for projecting a beam of electrons more or less along a diameter of the cylinder. The beam is formed with the aid of a grounded electron emitting cathode 2 and an apertured anode 4 in the usual manner, and a grid 3 is interposed as a means for controlling the intensity of the beam. Beam deflecting plates 5 are positioned to deflect the beam in a fixed vertical or axial plane so that the luminous spot produced on the screen traces a fixed line at substantially right angles to the direction of movement of the screen. If in any case an unobstructed view of the screen cannot be had, the area of view as indicated by the enclosure 6, may be so arranged that the aforementioned fixed line appears along the edge thereof whereby the trace left by the beam is carried across the viewing area by the movement of the screen.

The scanning receiver connected to radio antenna 10 may comprise, as shown, a preliminary radio frequency amplifier section 11 followed by a demodulator or detector 12 which is supplied with beating oscillations from a local source 13 of variable frequency. The detector 12 is preferably of a balanced type such that the beating oscillations do not appear at its output terminals but only the side-bands. The latter are applied to a band-pass filter 14 so that a portion of one of the side-bands, depending on the frequency of the beating oscillations, is passed on to an amplifier 15. A rectifier 16 connected to the output of amplifier 15 applies to control grid 3 of the oscilloscope a unidirectional voltage that varies in accordance with the intensity of the waves delivered by the scanning receiver.

The frequency to which the scanning receiver is tuned is determined by the frequency of beating oscillator 13, and by means operating on the latter it is caused to sweep repeatedly over the frequency range to be monitored. The operating means may take any of a variety of suitable forms well known in the art, such as a motor-driven frequency determining condenser in the oscillation circuit, adapted to vary the beating frequency over the necessary frequency range. In any case the scanning may be cyclically in one direction across the frequency range or alternately in both directions. The scanning frequency, that is, the number of times per second that the frequency range is scanned, should be of the order of many times per second for the purposes in view. Scanning frequencies ranging from ten cycles to sixty cycles per second have been successfully employed in various embodiments of applicant's invention and may be taken as illustrative.

Connected to deflecting plates 5 of the oscilloscope is a sweep circuit 20 which generates a periodic saw-tooth voltage wave that causes the spot on the oscilloscope screen to be displaced cyclically across the direction of movement of the screen. The cyclical displacement of the spot and the cyclical change in the frequency to which the scanning receiver is tuned can be and are synchronized so that every position of the spot along its line of movement corresponds with and indicates a predetermined frequency. In other words then, the cross dimension of the screen is established as a coordinate axis representing frequency. The synchronizing means indicated diagrammatically at 21 interconnects beating oscillator 13 and sweep circuit 20 and may assume any form convenient and appropriate for use with the specific forms of beating oscillation control and sweep circuit chosen in a particular case.

In a typical case, the cathode ray spot is caused to move repeatedly from, say bottom to top of the viewing area while the tuning of the scanning receiver is synchronously changed or varied from bottom to top of the frequency range to be monitored. At each instant the brightness of the spot is more or less proportional to the wave energy appearing at that instant in the frequency band to which the receiver is tuned, and the circuit components may be so proportioned that in the absence of any such wave energy the spot is just barely extinguished. On each passage of the spot across the screen a line record is left which, by virtue of the variations in brightness along its length, indicates how wave power is distributed throughout the frequency range of interest, at substantially a given instant of time. In view of the movement of the screen, the successive line records appear side by side in registry with each other so that the manner in which wave power varies with time in any given frequency band appears also. Thus telephonic signals appear on the screen as a horizontal line or band with irregular edges corresponding to the speech modulation. Telegraphic signals assume a characteristic form on the screen from which they may be distinguished from telephonic signals, and, in fact, for normal telegraphic sending speeds, luminous dots and dashes conforming with the telegraphic signal flow continuously across the viewing area distinctly enough that the message may be read if desired.

Impulses of short duration or other received radio waves of unusual character may be quickly and easily detected for they generally produce an unusual effect in the visual pattern and the effect persists for at least a matter of seconds.

The embodiment of the invention that is illustrated in Fig. 2 is similar in general outline to that of Fig. 1 in that a scanning receiver and oscilloscope with moving screen are associated to produce substantially the same kind of visual representation.

The oscilloscope is of a type disclosed in detail and claimed in an application of J. B. Johnson, Serial No. 422,192, filed December 9, 1941 (Patent No. 2,324,089, July 13, 1943). It comprises a large substantially spherical portion and a neck-like extension in which are mounted a cathode and apertured anode for producing an axially directed electron beam. A control grid 3 is interposed to permit control of the intensity of the beam. The structure is arranged to be rotated continuously about its axis and slip rings and brushes are provided to permit connection of the various electrodes to external circuits. The screen comprises a wide equatorial band of luminescent material deposited on the inner surface of the spherical portion of the tube. To bend the axially directed beam so that it impinges on the screen, magnetic bending coils are provided. The latter comprise a pair of stationary coils 45 closely associated with the spherical portion of the tube and disposed at opposite sides thereof to produce a crosswise magnetic field. Another pair of coils 46 is similarly disposed at right angles to the first pair to produce a cross-magnetic field at right angles to that produced by the pair 45. The front coil 46 may be approximately rectangular as shown and large enough that it serves to define or expose the viewing area and the other three coils may be of the same size and form. The excitation of the two sets of coils is then so adjusted that the spot appears at one side of the viewing area or, more particularly for example, at the lower right-hand corner thereof.

Stationary magnetic means are provided also for controllably deflecting the electron beam in an axial plane so that the spot can be controllably displaced along a line of longitude on the screen. The deflecting means comprises a pair of stationary coils 53 disposed on opposite sides of the neck-like extension of the tube near the upper end thereof and oriented to serve the purpose described.

The scanning receiver connected to antenna 10 comprises an input filter 31 for admitting only the frequency range to be monitored (which will be assumed for specific example to lie between 2 and 10 megacycles), the radio frequency amplifier stage 32 and a first modulator 33. Beating oscillations are supplied to modulator 33 from a source 34 the frequency of which is continuously varied by a voltage-responsive frequency controller 35 that is operated by a saw-toothed voltage wave derived through adjustable attenuator 36 from a sweep circuit 37. The latter is connected also through amplifier 39 to beam deflecting coils 53 whereby the luminous spot is cyclically displaced across the screen, at substantially right-angles to the direction of movement thereof, in substantially the same manner described with reference to Fig. 1 and sweep circuit 20 thereof.

The frequency controller 35 may be of a kind well-known in the art of frequency modulation in which a so-called reactance tube circuit is connected to introduce into the tank circuit or other frequency determining portion of the associated oscillator a reactance which varies in accordance with the voltage of a control wave applied to the reactance tube circuit. Since the control voltage is derived from the sweep circuit the cyclical displacement of the luminous spot is automatically synchronized with the changes in the frequency of the beating oscillations applied to modulator 33. Adjustable attenuator 36 controls the width of the frequency band swept by the beating oscillator 34, and adjustable biasing source 38 controls the frequency position of the band. These elements may be so adjusted, for example, that the beating oscillations range from 30 to 38 megacycles.

The side-band output of modulator 33 is applied to a filter 40 which is arranged to select from one of the side-bands that is swept across its input terminals a range of frequencies several times as wide as the frequency band ultimately to be used for control of the oscilloscope The pass-band of filter 40, for specific example, may have a mid-frequency of 40 megacycles and a width of 200 kilocycles. Filter 40 is followed by a second modulator 41 which is supplied with beating oscillations from an oscillator 42. The latter may have an operating frequency of 40.548 megacycles, for example, whereby one of the side-bands produced has a mid-frequency of about 548 kilocycles. At this comparatively low frequency it is fairly easy to construct a band-pass filter having a narrow pass-band. Filter 43 which follows modulator 41 in circuit is accordingly designed to have a mean pass frequency of about 548 kilocycles and a band width of 15, 10 or 25 kilocycles, for example, depending on operating conditions. A set of filters 43 having these different band widths may be provided and one or another connected into circuit as desired.

Inasmuch as the intensity of the output of filter 43 may have a range substantially greater than that which could effectively or safely be applied to the control grid 3 of the oscilloscope, an amplitude compressor 44 may be interposed in circuit to restrict the intensity variation to a range accommodated to the capacity of the oscilloscope. The compressed waves are then amplified as may be required and applied without rectification to control grid 3. Preferably the circuit is so arranged that in the absence of signal energy the spot is just barely extinguished.

In view of the foregoing description of Fig. 2 it will be understood that the spot moves vertically along the right-hand edge of the viewing area in synchronism with the changes in tuning of the receiver organization whereby the vertical dimension of the viewing area is established as a coordinate of frequency. The brightness of the spot is at every instant correlated with the wave intensity appearing in one or another narrow band within the 2 to 10 megacycle range being monitored. The visual representation of the activity in the several frequency channels is of the same character as that obtained in the Fig. 1 system and it flows across the viewing area at a rate depending on the velocity of rotation of the oscilloscope. In one practical embodiment of the Fig. 2 system, the oscilloscope tube had a diameter of 10 inches, the viewing area was approximately five inches square and the oscilloscope was rotated at a rate of two revolutions per minute thus producing approximately one inch of horizontal movement of the screen per second. In this embodiment it will be noted the visual representations remain within the viewing area for about five seconds.

To obtain a magnified picture of the activity in only a portion of the 2 to 10 megacycle range, it is necessary merely to adjust the limits of the frequency variation of oscillator 34 according to the frequency limits of the particular range to be explored in detail. The width of the frequency range scanned in the Fig. 2 system can be controlled by adjusting attenuator 36 to reduce the voltage variation applied to frequency controller 35, and the mid-frequency is controlled by variable voltage source 38. With attenuator 36 set for magnification the adjustment at 38 virtually permits the magnifier to be swept over the 2 to 10 megacycle range at will. When only a limited range is being scanned, greater definition can be effectively obtained by employing a filter 43 that has a comparatively narrow pass-band, such as 1 to 5 kilocycles.

To facilitate tuning an auxiliary radio receiver to any particular signal appearing on the screen, and to facilitate accurate determination of the radio frequency of such signal, an auxiliary oscillator 60 of adjustable frequency is provided. The output of this oscillator is connected to the input terminals of filter 31 so that the oscillations are supplied concurrently with the received radio signals. These oscillations pass through the scanning equipment and eventually produce on the screen a horizontal line trace in a frequency position corresponding to the oscillation frequency. The frequency adjustment of oscillator 60 is mechanically or electrically geared with the tuning control of receiver 61 so that the oscillation frequency and the frequency to which the receiver is tuned are always alike. Thus the frequency of oscillator 60 may be varied until the corresponding line trace coincides with the trace of a signal or other transmission to be investigated and automatically receiver 61 is tuned to receive the same signal. The tuning of a radio transmitter 62 may also be synchronized with the frequency adjustment of oscillator 60 so that radio interference can be created at will in any frequency channel represented on the screen.

What is claimed is:

1. In combination, radio wave receiving means for repeatedly scanning a predetermined portion of the radio frequency spectrum, an oscilloscope comprising a luminescent screen and means for directing an electric discharge beam against said screen whereby a luminous trace is produced thereon, means for cyclically displacing said discharge beam in synchronism with the repeated scanning, means for modifying said discharge beam in accordance with a parameter of the output of said scanning means, and means for moving said screen to bring different portions thereof successively into a predetermined viewing relation to an observer.

2. In combination, radio wave receiving means adapted to selectively receive substantially simultaneously radio waves lying in different component frequency bands within a wide range of received radio frequencies, an oscilloscope comprising a luminescent screen and means producing on said screen a luminous spot of controllable position and brightness, means for displacing said spot to different positions respective to the several bands, means for concurrently varying the brightness of said spot in any of its said positions in accordance with the varying intensity of the received waves in the respectively corresponding frequency band, and means establishing progressive relative movement between said spot and said screen to afford a time axis.

3. In combination, radio wave receiving means adapted to selectively receive substantially simultaneously radio waves lying in different component frequency bands within a wide range of received radio frequencies, an oscilloscope comprising a luminescent screen and means producing on said screen a luminous spot of controllable position and brightness, means for displacing said spot to different positions respective to the several bands, means for concurrently varying the brightness of said spot in accordance with the varying intensity of the received waves in the respectively corresponding frequency band, the said positions being substantially confined to a predetermined fixed region, and means for progressively moving said screen to bring different portions thereof successively into said region.

4. In a system comprising an oscilloscope or the like in which a beam can be controllably directed to different parts of the oscilloscope screen to produce a persisting luminous trace, the method of visually representing radio activity which comprises cyclically scanning the radio frequency spectrum to obtain an indication of the intensity of the radio activity in each frequency band and simultaneously varying the brightness of the trace in accordance with said indication of intensity, moving the trace along one coordinate in synchronism with the change in scanning frequency, and establishing continuous relative movement between the trace and the screen along another coordinate.

5. In a radio system, means for detecting radio activity appearing in any of a multiplicity of different radio frequency channels lying within a definite frequency range, a cathode ray oscilloscope including a luminescent screen and means for producing on said screen a luminous trace of controllable position, means for moving said trace relative to and across said screen progressively in a predetermined direction to represent the passage of time, means for displacing said trace crosswise of the direction of the aforesaid progressive movement to different positions respective to the different channels, and means controlled by said detecting means for modulating the luminous trace generated in any of said positions in accordance with variations in the intensity of the radio activity in the respectively corresponding channel.

6. In a system for continuously monitoring radio activity appearing in a multiplicity of radio communication channels, means for receiving simultaneously the waves appearing in all of said channels, band-pass filter means of adjustable mean frequency having a band width not substantially greater than the frequency spacing of said channels, means for repeatedly varying said mean frequency progressively across the frequency range occupied by said channels many times a second, an oscilloscope comprising a luminescent screen, means for projecting an electric beam discharge against said screen whereby a luminous spot is formed thereon, beam-deflecting means for repeatedly sweeping said spot along a substantially fixed path in synchronism with the repeated variations in said mean frequency, means for varying the intensity of said beam discharge in accordance with the variations in the intensity of the waves passed by said filter means, and means for progressively moving said screen so that said spot follows a closed path thereon.

7. The method of visually representing radio activity on a luminescent record surface which comprises receiving radio waves lying within a wide frequency range, repeatedly scanning the received waves, deriving from the scanned waves a measure of the wave intensity in the component bands thereof, generating a luminous spot on said record surface, varying the brightness of said spot in accordance with the variations in said measure of wave intensity, moving said record surface in one direction and displacing said spot cyclically across the said direction of movement in synchronism with the repeated scanning.

8. In combination, a radio wave receiver tunable throughout a range of frequencies, means for scanning radio waves impressed on said receiver comprising means for cyclically varying the frequency to which said receiver is tuned, a cathode ray oscilloscope having a luminescent screen, means for rotating at least the screen of said oscilloscope, means for varying the intensity of the cathode ray in accordance with the output of said receiver, means for deflecting said cathode ray cyclically in synchronism with the cyclical variations in the tuning of said receiver, and cathode ray deflecting means for maintaining said cathode ray in a fixed plane.

RALPH K. POTTER.

REFERENCES CITED

The following references are of record in the file of this patent:

UNITED STATES PATENTS

| Number | Name | Date |
| --- | --- | --- |
| 2,084,760 | Beverage | June 22, 1937 |
| 1,917,268 | Mirick | July 11, 1933 |
| 1,535,329 | MacGregor-Morris | Apr. 28, 1925 |
| 2,268,523 | Clothier | Dec. 30, 1941 |
| 2,231,929 | Lyman | Feb. 18, 1941 |
| 2,279,151 | Wallace | Apr. 7, 1942 |
| 2,273,914 | Wallace | Feb. 24, 1942 |
| 2,098,695 | Southwick | Nov. 9, 1937 |
| 2,237,440 | Jones | Apr. 8, 1941 |